US011941692B2

(12) United States Patent
Raitsev et al.

(10) Patent No.: US 11,941,692 B2
(45) Date of Patent: Mar. 26, 2024

(54) EVENT TRIGGERED TRADING

(71) Applicant: Chicago Mercantile Exchange Inc., Chicago, IL (US)

(72) Inventors: James Raitsev, Arlington Heights, IL (US); Stanislav Liberman, Buffalo Grove, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 607 days.

(21) Appl. No.: 15/018,545

(22) Filed: Feb. 8, 2016

(65) Prior Publication Data
US 2016/0232611 A1 Aug. 11, 2016

Related U.S. Application Data

(63) Continuation of application No. 11/743,243, filed on May 2, 2007, now abandoned.

(51) Int. Cl.
*G06Q 40/04* (2012.01)
*G06Q 10/087* (2023.01)
*G06Q 40/02* (2023.01)

(52) U.S. Cl.
CPC ........... *G06Q 40/04* (2013.01); *G06Q 10/087* (2013.01)

(58) Field of Classification Search
CPC ......... G06Q 40/04; G06Q 40/06; G06Q 40/00
USPC .......................................................... 705/37
See application file for complete search history.

(56) References Cited

U.S. PATENT DOCUMENTS

| 7,844,536 B1* | 11/2010 | Andrews | G06Q 40/04 705/37 |
| 7,933,830 B1* | 4/2011 | Buck | G06Q 40/06 705/37 |
| 8,688,562 B1* | 4/2014 | Buck | G06Q 40/06 705/37 |
| 2002/0046151 A1* | 4/2002 | Otero | H04W 4/00 705/37 |
| 2002/0091617 A1* | 7/2002 | Keith | G06Q 40/06 705/37 |

(Continued)

FOREIGN PATENT DOCUMENTS

| WO | WO-0063814 A1 * | 10/2000 | G06Q 40/06 |
| WO | WO-0108065 A1 * | 2/2001 | G06Q 50/16 |

OTHER PUBLICATIONS

Michael Kearns and Luis Ortiz, "The Penn-Lehman Automated Trading Project", Nov./Dec. 2003, IEEE Computer Society, pp. 22-31 (Year: 2003).*

(Continued)

*Primary Examiner* — Ryan D Donlon
*Assistant Examiner* — Irene S Kang
(74) *Attorney, Agent, or Firm* — LEMPIA SUMMERFIELD KATZ LLC

(57) ABSTRACT

Networks, systems and methods for event triggered trading of investment vehicles are disclosed. Orders that are conditioned upon events occurring outside a market may be submitted to an exchange. The conditional orders may be held or stored until the occurrence or non-occurrence of the event. An event data feed is provided to provide information identifying the occurrence or non-occurrence of the event. In response to receiving information via the data feed identifying the event, the orders conditioned upon the event will be triggered, matched, and executed.

11 Claims, 3 Drawing Sheets

(56) References Cited

U.S. PATENT DOCUMENTS

| | | | | |
|---|---|---|---|---|
| 2003/0236738 A1* | 12/2003 | Lange | ............ | G06Q 30/08 |
| | | | | 705/37 |
| 2005/0027635 A1* | 2/2005 | Monroe | ............ | G06Q 40/04 |
| | | | | 705/37 |
| 2006/0184447 A1* | 8/2006 | Nieboer | ............ | G06Q 40/04 |
| | | | | 705/37 |
| 2008/0097893 A1* | 4/2008 | Walsky | ............ | G06Q 30/0601 |
| | | | | 705/37 |
| 2009/0063326 A1* | 3/2009 | Matsushima | ............ | G06Q 40/04 |
| | | | | 705/37 |
| 2011/0251942 A1* | 10/2011 | Rosenthal | ............ | G06Q 40/04 |
| | | | | 705/37 |
| 2011/0320338 A1* | 12/2011 | Farrell | ............ | G06Q 40/04 |
| | | | | 705/37 |

OTHER PUBLICATIONS

Feb. 12, 2016—(EPO) File History—App. 08746934.2—1958/2143058—Eng Tran.
Feb. 12, 2016—(SG) File History—App. 2009070228—Eng Tran.
Feb. 12, 2016—(ZA) File History—App. 200907259—Eng Tran.
Feb. 11, 2016—(US) File History—U.S. Appl. No. 11/743,243.
"Making computers newsreaders", Dan Sabbagh, Jul. 26, 2006, Timesonline, http://business.timesonline.co.uk/tol/business/industry_sectors/media/article 693404.ec?p . . . , 1 page.
Jul. 17, 2008—(PCT)—International Search Report—App. PCT/US/08/61614—Eng. Tran.
"From Reuters, Automatic Trading Linked to News Events", Jeremy W. Peters, Dec. 11, 2006, http://www.nytimes.com/2006/12/11/technology/11reuters.html? r=1&oref=slogin@ref)=business . . . retrieved Dec. 12, 2006, 2 pages.
Real-Time Data, http://www.cme.com/trading/dta/real/index.html, retrieved Mar. 1, 2007, 2 pages.
Order (exchange), Wikipedia, http://en.wikipedia.org/wiki/Order_%28exchange%29, retrieved Feb. 27, 2007, 3 pages.
CME 2007 Economic Release Calendar, http://www.cme.com/files/economicreleasecalendar.pdf, © 2006, 33 pages.
Nov. 12, 2009—(PCT) International Preliminary Report on Patentability—App. PCT/US2008/061614—Eng Tran.
Feb. 12, 2015—(EP) Supplementary Search Report—App. 08746934.2—2221/2143058 PCT/US2008061614—Eng Tran.
Historical Weather Data, CME Weather Data is provided by EarthSat, http://www.cme.com/rading/dta/hist/ftp_weather3111.html, retrieved Mar. 1, 2007, 2 pages.
PPH Request—Certificate of Grant, 2008247884, dated May 16, 2013.
PPH Request—Applicant's Response to Examiner's First Report dated Apr. 16, 2012, dated Dec. 3, 2012.
PPH Request—Examiner's First Report on Patent Application No. 2008247884, dated Apr. 16, 2012.
PPH Request—OEE Work Product, Notice of Allowance dated Jan. 16, 2013.

* cited by examiner

EVENT TRIGGERED TRADING

RELATED APPLICATIONS

This application is a continuation of U.S. patent application Ser. No. 11/743,243 filed May 2, 2007, entitled: "Event Triggered Trading", the disclosure of which are hereby incorporated by reference in their entirety.

TECHNICAL FIELD

Aspects of the invention relate to systems, apparatuses, and methods for managing trading of investment vehicles. In particular, aspects of the invention relate to automated trading of investment vehicles according to triggering events.

DESCRIPTION OF RELATED ART

Trading systems, such as algorithmic trading systems, automatically submit orders for financial instruments on electronic trading platforms. The systems use econometrics, financial mathematics, stochastic, artificial intelligence and other sophisticated mathematical models for making transaction decisions. The models may evaluate data according to rules that determine an optimal time to enter an order to a market. For example, a trading system may evaluate market data to determine the timing and volume for an order to minimize the impact on a price for the financial instrument.

The data evaluated by many algorithmic trading systems is limited to information that results from the market itself, such as market data (e.g., stock price, trading volume, etc.) For example, many algorithmic trading systems evaluate market data received from an exchange to identify pricing and pricing trends. The market data is transmitted from the exchange to the algorithmic trading system, where it is evaluated. When criteria are met, the algorithmic trading system automatically submits an order to the exchange. The transmission of data to and the orders from the algorithmic trading system is plagued with latency and delays. A trading system using a low-bandwidth, high-latency telecommunications service provider may suffer, for example, a disadvantage compared to a trading system connected through a high-bandwidth, low-latency telecommunications service provider.

At least one trading system (e.g., Reuter's NewScope program) appears to permit a trader to establish trading strategies based on events that may occur outside of a market or exchange. To do so, a trader may program his or her personal computer to buy or sell a stock automatically based on a news announcement. The trading system scans a live news feed (e.g., a live news feed from Reuters) to parse news items and watch for the relevant news stories. Nevertheless, the trading system suffers from the same dependency on the bandwidth and latency constraints of its telecommunications service provider. Furthermore, the trading system may suffer from incorrect and/or inaccurate scans of a live news feed that result in an incorrect trade being automatically executed.

Therefore, there exists a need in the art for a system, apparatus, and method for managing trading of investment vehicles that overcomes one or more of these limitations.

BRIEF SUMMARY

By way of introduction, a conditional buy/sell order may be submitted to an exchange and executed when an external condition, such as an announcement of the Federal Reserve on interest rates, is met. The exchange receives the order, and may place the conditional order in a queue until an expected announcement of event occurs. A data feed carrying standardized information related to events is received at the exchange. When information related to a conditional order is received, the orders in the queue conditioned upon the event may be triggered. The conditional orders may be executed or cancelled. A confirmation message may be transmitted to the trader who placed the conditional order. Likewise, when it is determined that the event occurred, but the condition, or desirable outcome, did not occur, the trader may be notified and given the option to modify the order, before it is cancelled.

A computer-implemented system for use in an exchange for a financial instrument is disclosed in accordance with just one aspect of the invention. The system may comprise an order receiving device, an order storage device, an event feed, a matching engine, and an order processing device. A trader may submit a conditional order to the exchange in accordance with aspects of the invention. The conditional order may be conditioned upon the occurrence (or non-occurrence) of predetermined events occurring outside of the market for the financial instrument.

The foregoing summary is provided only by way of introduction. The features and advantages of aspects of the invention may be realized and obtained by the instrumentalities and combinations pointed out in one or more of the claims. Nothing in this section should be taken as a limitation on the claims. Additional features and advantages will be set forth in the description that follows, and in part will be obvious from the description, or may be learned by practice of aspects of the invention.

BRIEF DESCRIPTION OF THE DRAWINGS

Examples of event triggered trading systems are described with reference to the accompanying drawings, in which components, features and integral parts that correspond to one another each have the same reference number, wherein.

DETAILED DESCRIPTION

Figure 1:
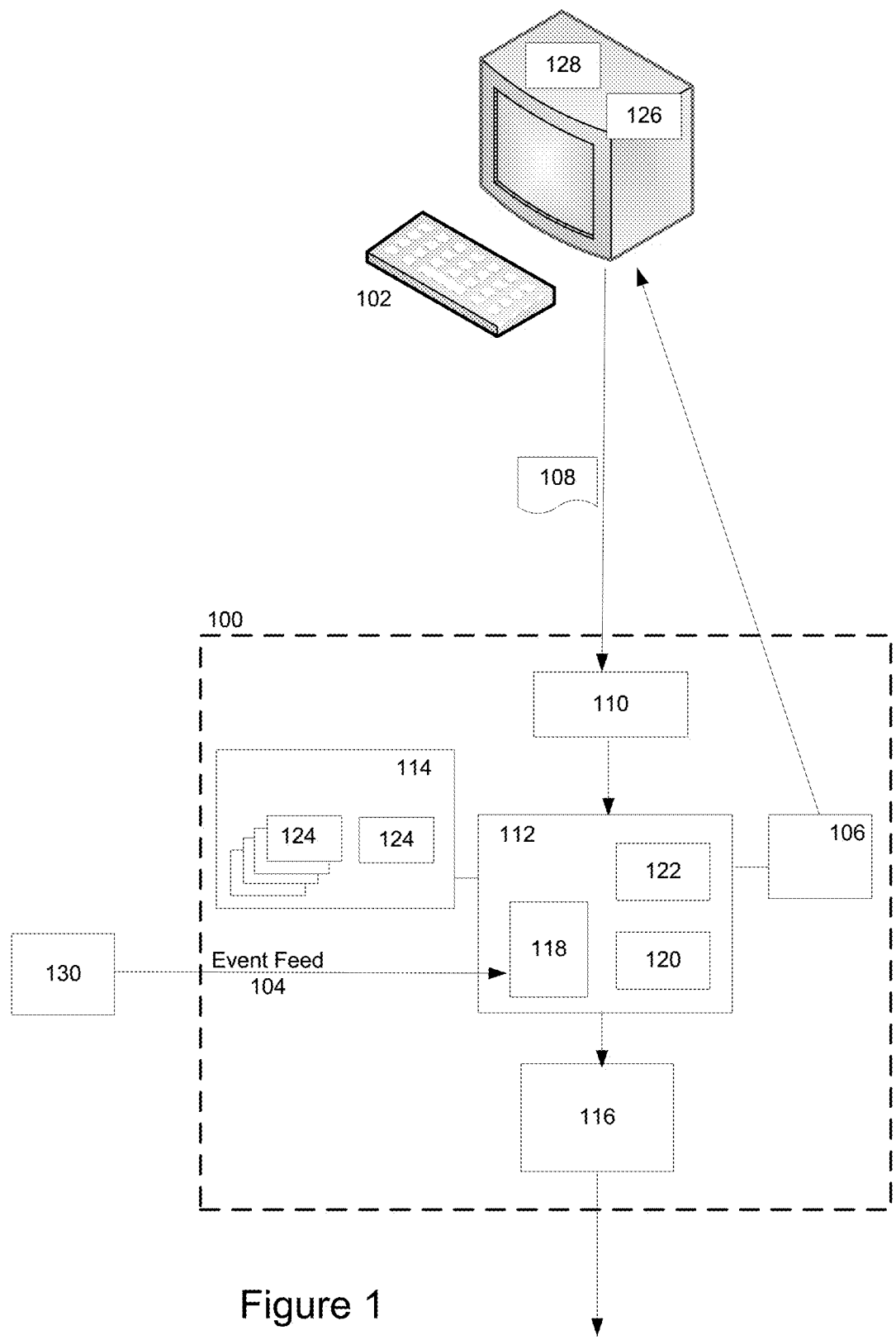
FIG. 1 shows an exemplary system that may be used to implement aspects of an event triggered trading system.

The event triggered trading systems may take physical form in certain parts and steps, embodiments of which will be described in detail in the following description and illustrated in the accompanying drawings that form a part hereof. Event triggered trading systems, methods and apparatuses may be achieved in many different forms, formats, and designs and should not be construed as limited to the exemplary embodiments set forth herein. One or more embodiments in accordance with aspects of the invention may administer, communicate, manage, place, enter, receive, match, clear, present, display, store, execute, and/or confirm orders that may be triggered according to events that occur outside a market for the financial instrument of the order.

Embodiments may take the form of one or more devices, systems, distributed networks, data processing systems, processes, electronic hardware, computer software, firmware, including object and/or source code, and/or combinations thereof. Embodiments may be stored on computer-readable media installed on, deployed by, resident on, invoked by and/or used by one or more data processors, controllers, computers, clients, servers, gateways, networks of computers, and/or any combinations thereof. The computers, servers, gateways, may have one or more controllers configured to execute instructions embodied as computer software. Embodiment may be transmitted as a carrier signal from a first electronic device to another electronic device. The carrier signal, when received at an electronic device and executed by a processor, may provide a means for event triggered trading in accordance with aspects of the invention.

An illustrative embodiment may include software stored and/or executed on one or more matching engines, or servers, having electronic components configured to carry out instructions according to a computer program stored on a computer-readable storage medium, such as a memory, hard disk, CD-ROM, optical storage device, magnetic storage device and/or combinations thereof to match event triggered orders for financial instruments. The matching engine may communicate with an associated memory (e.g., storage device) comprising one or more queues for in which conditional orders are temporarily stored pending the occurrence or non-occurrence of an external predetermined event. A data feed may be used by the matching engine to receive standardized information concerning the occurrence or non-occurrence of the event. When the data is received via the event data feed, the orders in the associated memory (e.g., conditional order queue) conditioned upon the event are processed by the matching engine along with all other orders processed at the matching engine.

Aspects of event triggered trading may be implemented with electronic computing devices and/or networks (e.g., Internet, telecommunication networks, local area networks, wide area networks, private proprietary networks, etc.) configured to allow users to exchange and submit trading information. An illustrative trading network environment for submitting, storing, and matching event triggered orders, or conditional orders, for financial instruments and methods thereof in accordance with various aspects of the invention are shown in FIG. 1.

An electronic trading system, such as the Globex® trading system, may be associated with an exchange 100. In an embodiment, the electronic trading system is a combination of globally distributed computers, controllers, servers, networks, gateways, routers, databases, memory, and other electronic data processing and routing devices. Using an order entry device 102, a conditional order 108 for one or more financial instruments may be placed with the exchange 100. The order entry device 102 may be any type of electronic computing device having a processor configured to execute coded instructions stored on or resident on a data storage medium. In one embodiment, the order entry device 102 may be a remote trading terminal or personal computer. The order entry device 102 may communicate with the exchange 100 over a network communication, such as, but not limited to, the Internet, a T1 line, a common local area network (LAN), radio, wired telecommunications network, wireless telecommunication network, etc.

FIG. 1 describes a system comprising one or more electronic computing devices that cooperatively provide for the management of the trading of investment vehicles. In one illustrative embodiment, the system may be comprised of an exchange 100, one or more order entry devices 102, and an event feed provider 130. A trader may create and submit conditional orders in accordance with aspects of the invention. In one embodiment, a trader (or any person interested in creating and/or submitting a purchase/sale of a financial instrument) may use an order entry device 102 to create and/or submit a conditional order to an exchange. Computer-executable instructions (e.g., software, firmware, etc.) on the order entry device 102 may provide the trader with a graphical user interface to visually construct the conditional order, including selecting one or more triggering conditions for the conditional order. The triggering conditions may be stored in a data storage device 106 in the exchange 100.

The event feed provider 130 may provide data corresponding to an occurrence (or non-occurrence) of a predetermined event. The data transmitted through an event feed 104 may be provided by a news reporting service (e.g., Associated Press, Reuters, etc.) or any other data distribution provider that has agreed beforehand to provide the exchange 100 with a predetermined data value upon the occurrence (or non-occurrence) of an event corresponding to a predetermined triggering condition. In one example, the event feed provider 130 may be a handheld computing device (e.g., a PDA, blackberry, mobile phone, laptop, etc.) that a news reporter (or other member of a reporting service) may use to enter information relating to the occurrence (or non-occurrence) of a predetermined event. For example, a news reporter attending a press conference of the Federal Reserve Bank may report that the Chairman has announced that interest rates will be increased by ten basis points. The event feed provider 130 device may format the information into a predetermined format and transmit directly to one or more exchanges 100 via an event data feed 104. Alternatively, the information entered at the event feed provider 130 may be transmitted to one or more computers controlled by the news reporting service where it is processed and/or routed to an exchange 100 via the event data feed 104.

The exchange 100 may receive the event feed 104 through a predefined interface and route the generated event notification messages to the appropriate devices and/or engines. The event feed 104 may comprise data structured in a standardized format (e.g., in a predetermined structured format and/or using a predetermined communication protocol) which can be more easily and/or efficiently processed than a standard news feed known to one of skill in the art. One of skill in the art will appreciate after review of the entirety disclosed herein that various techniques may be employed in determining a standardized event feed format, including payload optimization, latency, packet loss, and other considerations.

The data of the event feed 104 may be transmitted in various ways, including but not limited to, in the form of data packets, messages, and/or streamed data. In one example, the event feed may not include any commentary in order to minimize any risk of misinterpretation. The exchange 100 may include an event feed comparator 118 to compare the data of the event feed 104 with a plurality of predetermined values indicating the occurrence of a triggering event. In one example, messages sent via the event feed 104 may include a header identifying the message as carrying information related to a predetermined event, the source of the message, and/or the targeted recipients for the message. The header may also identify a class of information or the contents therein. The information in the message may be compared against a log and/or index of pending conditional orders (e.g., temporarily stored in the order storage device 114). The comparison may be performed by an event feed comparator 118 to identify one or more pending conditional orders in the collection of conditional orders (e.g., in a queue 124 in the order storage device 114) which may be affected by the data provided in the message of the event feed.

For example, an exchange 100 may be interested in providing traders with an option to submit a conditional order triggered by a Federal Reserve announcement of an interest rate change. In such an example, a news reporting service may transmit a data value of "FR_IR_UP" over the event feed 104 to indicate that the Federal Reserve has announced an upward change in the interest rate. The news reporting service may transmit a data value of "FR_IR_DOWN" over the event feed 104 to indicate that the Federal Reserve has announced a downwards change in the interest rate. Meanwhile, the news reporting service may transmit a data value of "FR_IR_SAME" over the event feed 104 to indicate that the Federal Reserve has announced that the interest rate shall remain unchanged. At least one benefit of providing a predetermined data value over an event feed 104 to the exchange 100 is that the response time for triggering a conditional order after the occurrence of an event is enhanced. Furthermore, the risk of inaccurate automated parsing and/or human interpretation of a conventional news feed is reduced. A event feed comparator 118 may perform a comparison of the data of the event feed 104 with list of predetermined data values that trigger a triggering condition, and may output, in one example, a Boolean true or false to indicate a match or no match.

In another example in accordance with aspects of the invention, the event feed 104 may include messages that indicate that the Federal Reserve has announced that it will raise prime interest rate by 0.25%. A comparison may be made to identify any conditional orders that are conditioned on such a Federal Reserve announcement. The triggering condition may be that the announcement will be to raise rates at least 0.25% or some other condition associated with the announcement. For each order in the collection of orders 124 for which the triggering condition has been determined to be met will be dumped to the matching engine 112 for processing. The collection of conditional orders may be stored in the buffer, until predetermined expiration time or until an event upon which the order is conditioned occurs. Likewise, the orders may be stored until after a period of time that an event is expected to occur, but does not. After the complementary orders are matched, the post match processing may provide clearing and confirmation processing.

A list of predetermined triggering conditions corresponding to the occurrence (or non-occurrence) of an event may be maintained in the memory of a data storage device 106. The data storage device 106 may be configured to store a plurality of predetermined triggering conditions corresponding to the occurrence (or non-occurrence) of predetermined events. A conditional order 108 in accordance with aspects of the invention is different from well-known conditional orders based solely on a market price of a financial instrument (e.g., limit order, stop order, trailing-stop order, etc.). A conditional order may be a bid, offer, buy, sell order for any financial instrument conditioned upon the occurrence (or non-occurrence) of a triggering vent that occurs outside of a market or an exchange. The triggering event is not dependent on the market, orders in the market, prices, or pricing trends. The triggering event may be a measurable occurrence outside of the market for financial instruments. The triggering event may affect changes in a market or market conditions. The triggering event may occur at a predetermined time and/or date, or may be a random or arbitrary occurrence. Some examples of triggering events include, but are not limited to, Federal Reserve announcements, cash earning announcements, trial verdicts, occurrence of natural phenomena, and other events such as those described in the "CME 2007 Economic Release Calendar," which is herein incorporated by reference (and publicly available for download at http://www.cme.com/files/economicreleasecalendar.pdf) and provided in an information disclosure statement accompanying the filing of this disclosure.

By way of example, a predetermined triggering condition may correspond to the event of Acme Corporation declaring bankruptcy. A trader may use the predetermined triggering condition (e.g., the occurrence of the event where Acme Corporation declares bankruptcy) in creating and submitting a conditional order in accordance with aspects of the invention. The exchange and/or other entity/person may select one or more predetermined events to provide as the basis for triggering conditions in the data storage device 106. At least one benefit of providing a list of predetermined events to traders is the potential for enhanced liquidity at the time of the triggering condition.

The plurality of predetermined triggering conditions may be made available to traders (and others) through an order entry device 102. The order entry device 102 may be configured to permit a trader (or other interested user) to create and submit a conditional order 108 to the exchange 100. In one example, the order entry device 102 may be a conventional personal computer (with at least a microprocessor 128 and memory 126) running software with a graphical user interface for permitting traders to easily create condition orders 108 in accordance with aspects of the invention. The graphical user interface may permit a trader to select (e.g., using a graphical dropdown box) from among a plurality of triggering conditions and financial instrument identifiers to create the conditional order 108. The order entry device 102 may access the data storage device 106 to obtain the plurality of predetermine triggering conditions for selection by the user.

Moreover, the order entry device 102 may be used to submit the conditional order to the exchange 100 in advance of the predetermined event. Therefore, a trader may develop a trading strategy based on predetermined events occurring outside of a market for the financial instrument and submit multiple trades accordingly to the exchange 100 in advance of the events occurring. In one or more embodiments, the trader may experience the additional benefit of priority over other traders with a similar trading strategy based on his or her submitting the trade to the exchange 100 earlier.

An order receiving device 110 at the exchange 100 receives the conditional order 108 and routes the conditional order 108 to the appropriate device/system. The order receiving device may be configured to receive a conditional order 108 for a financial instrument (e.g., MSFT, GEM, etc.) in accordance with aspects of the invention. The order receiving device 110 may be an interface for receiving conditional orders 108 into the exchange 100. The order receiving device 110 may be a portion of one or more other devices/system in the exchange 100. For example, the order receiving device may be comprised of computer-executable instructions running in a computer (e.g., mainframes, servers, gateways, controllers, desktops or computer with a 64-bit processor) of the exchange 100 that parse the contents of a conditional order 108. The order receiving device 110 need not be a physically separate and distinct computing device. Rather, in some embodiments, the order receiving device 110 may be a component located on the same computing device as one or more of the other devices/components depicted in FIG. 1.

In one embodiment, a conditional order 108 may be immediately routed to the matching engine 112 for processing. The matching engine 112 may determine that the conditional order is not ready to be triggered until a later date, or it may determine that the conditional order is ready for immediate execution or cancellation (depending on the data of the event feed 104). In one embodiment, the conditional order 108 may be analyzed and routed to the order storage device 114. In such an embodiment, the order receiving device 110 may parse the conditional order 108 and determine that the triggering condition of the conditional order 108 cannot be triggered until a future date. Therefore, the order receiving device 110 may route the conditional order 108 to the order storage device 114 for temporary storage until the triggering condition is met.

The order storage device 114 may be configured to store the conditional order in associated memory. The associated memory may be located internal to or external to the order storage device 114, so long as the order storage device 114 is able to read and write to the computer memory. At least one benefit of locating the order storage device 114 with its associated memory inside the exchange 100 is the reduced latency following the occurrence of a triggering condition or event and the execution of the respective conditional order. Since a conditional order 108 in the order storage device 114 has already been processed by the order receiving device 110 and is already inside the exchange 100, the conditional order 108 has a greater probability of being executed by an order processing device 116 before other orders. In contrast, an order triggered outside the exchange 100 by software monitoring an external event (e.g., the Federal Reserve raising interest rates) must travel over some telecommunication network (with a latency) to be processed by the order receiving device 110 at the exchange 100 before making its way to the matching engine 112.

The associated memory of the order storage device 114 may be divided into a plurality of storage areas. Each of the storage areas may correspond to a different triggering condition. For example, three queues may be allocated in the memory of the order storage device 114. One queue may be assigned to a triggering condition corresponding to an event relating to the Federal Reserve. Another queue may be assigned to a triggering condition corresponding to an event relating to the credit rating of Acme Corporation (e.g., whether Acme Corporation is filing for bankruptcy, whether Acme Corporation is rated with an 'A' grade by Moody's, etc.). Yet another queue may be assigned to a triggering condition corresponding to an event relating to the weather (e.g., whether there was greater than normal rainfall in a particular region over a period of time). The conditional orders corresponding to a particular triggering condition are stored together in a queue. The conditional orders in each queue may be processed with a first-in-first-out (FIFO) behavior, a last-in-first-out (LIFO) behavior, or any other technique known to those of skill in the art. For example, under a FIFO implementation, a first conditional order submitted to the exchange 100 a day before a second conditional order will be triggered and sent to the matching engine 112 (and subsequently the order processing device 116) before the second conditional order. Therefore, a first trader that develops a trading strategy and submits conditional orders 108 based on that strategy before a second trader may enjoy a slightly quicker order execution than the later trader.

Referring to FIG. 1, a matching engine 112 configured inside the exchange 100 to trigger a conditional order in response to the data of the event feed 104 is illustrated. The matching engine 112 may be used to match orders, or bids/offers and/or buys/sells, for a financial instrument. The financial instrument may be any investment vehicle including stocks, bonds, commodities, T-bills, securities, futures, ETF's, options, and any other appropriate financial product. The matching engine 112 may be implemented with software and/or hardware that executes one or more algorithms for matching orders.

In accordance with aspects of the invention, the matching engine 112 may be comprised of a matching event engine 120 and a matching order engine 122. The matching event engine 120 may be configured to determine if data of the event feed 104 matches the conditional order 108. In one embodiment, the event feed comparator 118 may be used in cooperation with the matching event engine 120 to determine if data of the event feed 104 matches the conditional order 108. Once it is determined that the conditional order 108 has been triggered, the matching event engine 120 may be used to identify opposing conditional orders that may be matched (e.g., paired up) and sent to the order processing device 116 for execution processing. In an alternative embodiment, the matching event engine 120 may route the conditional orders to the matching order engine 122 for other processing.

The matching engine 112 may comprise a matching order engine 122 configured to receive a conditional order 108 from the matching event engine 120 and to determine if market conditions match the conditional order. At least one advantage of some embodiments of the invention is that the matching order engine 122 of the exchange 100 need not necessarily be modified when implementing aspects of the invention. Rather, in various embodiments where the data of the event feed 104 matches the triggering condition of the conditional order, the matching event engine 120 may remove the triggering condition of the matched conditional order 108 before sending the conditional order 108 to the matching order engine 122.

In one example, a conditional order 108 may comprises a plurality of triggering conditions. Therefore, the matching event engine 120 may remove only the triggered condition from the plurality of triggering conditions of the conditional order when the data of the event feed 104 matches. In such an example, the modified conditional order may be sent to the order storage device 114 for temporary storage again while it awaits the occurrence of its other triggering conditions. One of skill in the art will appreciate that any number of conditional triggers are contemplated for a conditional order in accordance with aspects of the invention.

The matching engine 112 may be configured to match orders submitted to the exchange's trading system. The matching engine 112 may match orders according to currently known or later developed trade matching practices and processes. In an embodiment, bids and orders are matched on price, on a FIFO basis. The matching algorithm also may match orders on a pro-rata basis or combination of FIFO and pro rata basis. Other processes and/or matching processes may also be employed as are known by those of skill in the art.

Figure 2:
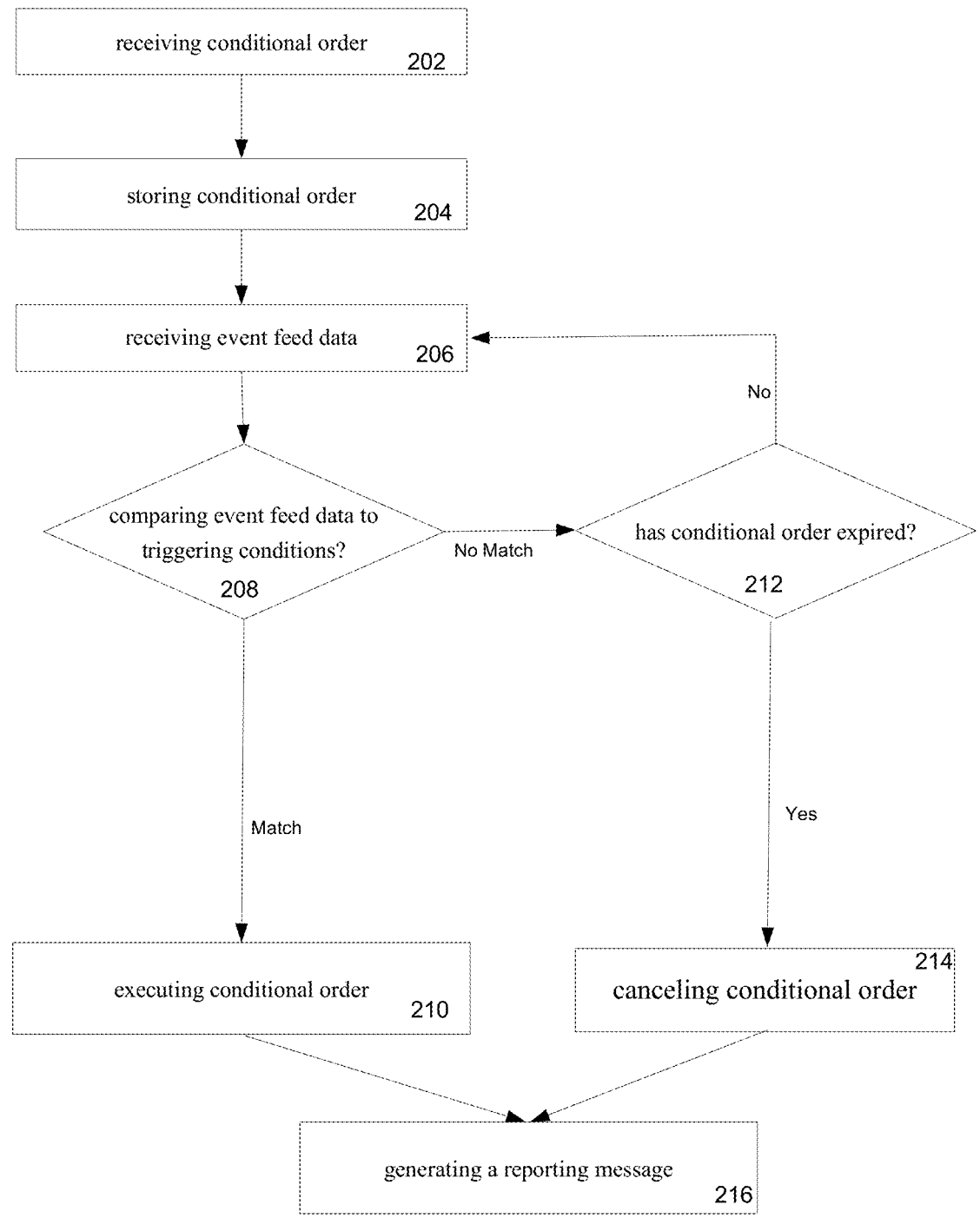
FIG. 2 shows a method that may be used to, among other things, receive, process, and execute event triggered orders and, FIG. 3 shows an illustrative method of monitoring predetermined events in accordance with one or more aspects disclosed herein.

FIG. 2 illustrates a method that may be used to match event triggered orders for financial instruments, in accordance with various embodiments of the invention. In step 202, a computing device (e.g., order receiving device 110) may receive a conditional order for a financial instrument. The conditional order 108 may be sent from an order entry device 102. The conditional order 108 may comprises a financial instrument identifier and a triggering condition corresponding to an occurrence of a predetermined event outside of a market for the financial instrument.

In step 204, the conditional order may be stored in a storage device in the exchange 100, as explained in detail earlier. The order storage device 114 and/or order receiving device 110 may identify (in step 204) the appropriate queue 124 in the storage area of the order storage device 114 for temporarily storing the conditional order. The order of placement in the queue 124 may be important because in various embodiments, a conditional order with a particular triggering condition may be assigned a higher priority in the queue than a second conditional order with the same triggering condition simply because the second conditional order arrived later at the exchange 100. Therefore, in various embodiments, traders may create and submit conditional orders 108 weeks (or any other period of time) in advance of a predetermined event in order to gain the greatest advantage in having their trade executed before others. In some embodiments, the exchange 100 may process orders without regard to priority, or may assign priority using a myriad of other considerations that would be appreciated by those of skill in the art.

In step 206, data from an event feed is received at the exchange 100. The data may correspond to the occurrence of a predetermined event outside of the market for the financial instrument. As explained earlier, the event feed may be provided in a standardized, predetermined format so as to minimize any possibility of data misinterpretation relating to an event's occurrence.

In step 208, the event feed comparator 118 compares the data received via the event feed with the triggering condition of the conditional orders stored in the order storage device 114 queues 124. One skilled in the art will appreciate that various techniques may be used for quickly comparing the event feed data value with the many triggering conditions pending with the conditional orders. For example, a hashing system may be used. In another example, queues may be setup for different triggering condition groups to divide and conquer the task of comparing the data values.

If a match is found in step 208, the conditional order 108 is matched in the matching engine 112 and sent to the order processing device 116 for execution. A message may be generated (in step 216) to report the execution of the conditional order for the financial instrument to the trader (i.e., user) of the order entry device 102.

Alternatively, if a match is not found in step 208, then the exchange 100 (e.g., matching engine 112, matching event engine 120) may determine whether the conditional order has expired (in step 212). The conditional order may have expired if the triggering condition has passed and a triggering of the event is no longer possible. For example, if the triggering condition corresponded to the consumer confidence index numbers for the specific month of October 2005 being reported above a certain threshold, then the conditional order will have expired in November 2005 because the triggering condition will have already been reported and will not be reported again for that month. In such cases, the conditional order is canceled in step 214. The trader is sent a reporting message indicating that his or her conditional order has been cancelled (in step 216). Alternatively, the trader may be provided with an option to modify his or her conditional order and/or to execute the order with the triggering condition removed.

Furthermore, the method steps illustrated in FIG. 2 may be stored as computer-executable instructions on a computer-readable medium. The computer-executable instructions may be executed by a microprocessor to perform the method steps described herein. Although various embodiments have been described and illustrated, the description and illustrations are by way of example only. Many more embodiments and implementations are possible within the scope of this invention and will be apparent to those of ordinary skill in the art. The various embodiments are not limited to the described environments, and can be applied to a wide variety of activities.

In addition, in accordance with aspects of the invention, an order entry device 102 is disclosed comprising a memory 126, a microprocessor 128, a visual display (illustrated in FIG. 1, 102 as a computer monitor display) and a user input device (illustrated in FIG. 1, 102 as a computer keyboard). The memory 126 may contain a computer-readable medium storing computer-executable instructions for execution by the processor 128. The instructions may be embodied, in one example, as computer software running on a personal computer behaving as an order entry device 102. The software may generate a graphical user interface for presentation on the visual display in order to permit the user to create a conditional order 108. The user may select from among a plurality of predetermined triggering conditions and financial instrument identifiers to create a conditional order. After receiving the parameters of the conditional order 108, the software may submit the conditional order to the exchange 100 in which it is directed. The user may receive an indication message from the exchange 100 displaying the status of the conditional order (e.g., executed, cancelled, pending, waiting, etc.)

Figure 3:
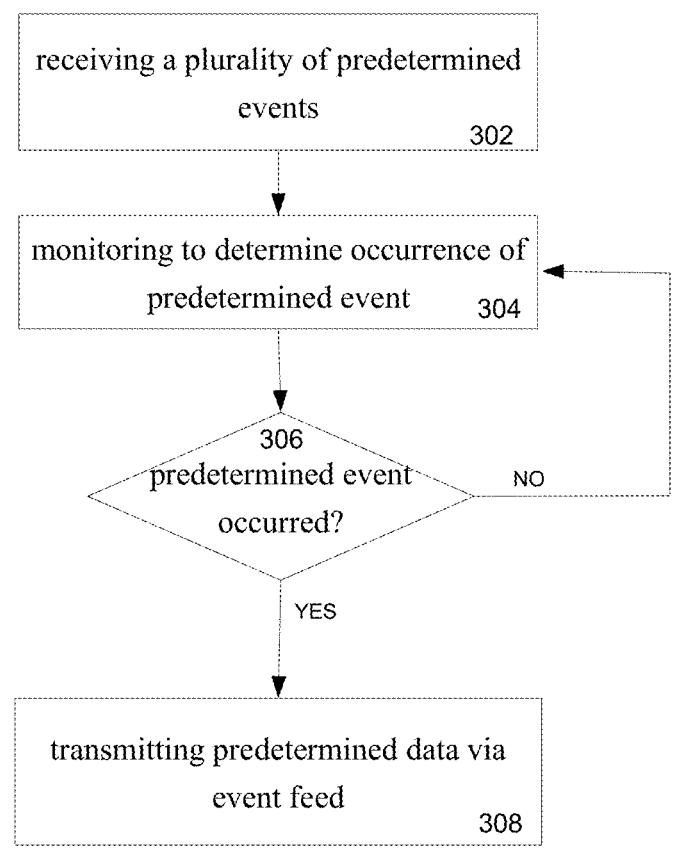

Referring to FIG. 3, in accordance with various aspects of the invention, the event feed 104 may be sent from a computing device 130 of a provider company to the exchange 100 for the financial instrument. The provider company and the exchange may have established and agreed upon a predetermined protocol and structure for transmitting the data of the event feed. Furthermore, an exchange 100 (or representative of the exchange 100) may transmit a plurality of predetermined events to the provider company to indicate which predetermined events the company will monitor to determine its occurrence (or non-occurrence). After receiving this plurality of predetermined events (in step 302), an employee (or other staff) at the provider company may monitor (in step 304) the occurrence of events relating to predetermined events. If the predetermined event occurs (step 306), the employee may enter the predetermined data values onto the event feed 104. The data may then be transmitted (in step 308) via the event feed to the exchange 100. The exchange 100 may perform a comparison on the data of the event feed 104 with a plurality of triggering conditions using the event feed comparator 118. As explained earlier, the other devices and/or engines/module of the exchange proceed to interact to process the conditional order accordingly.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Additional servers, computers, handheld devices, personal digital assistants, telephones and other devices may also be connected to exchange computer system 100. Moreover, the topology shown in FIG. 1 is merely an example and that the components shown in FIG. 1 may be connected by numerous alternative topologies.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

We claim:

1. A computer-implemented electronic trading system comprising:
   a processor;
   a storage device; and
   a non-transitory memory coupled with the processor and storing computer-executable instructions executable by the processor to cause the processor to implement:
   an electronic order receiving device that receives, from a first user via a first graphical user interface of an electronic order entry device implemented by a second processor, in advance of an occurrence of at least one of a plurality of predefined conditions which occur external to the electronic trading system, at least one conditional order of a plurality of conditional orders for a financial instrument over a communication network coupled with the electronic order receiving device disposed between the electronic order entry device and a matching order engine, the at least one received conditional order specifying at least one of the plurality of predefined conditions which occur external to the electronic trading system subsequent to receipt of the conditional order, wherein the electronic order receiving device is further operative to process the conditional order, determine that the at least one of the plurality of predefined conditions cannot occur until a future time, and store the processed conditional order in the storage device coupled therewith, the storage device being divided into a plurality of storage areas, wherein a plurality of processed conditional orders specifying the same at least one predefined condition are stored together in a same storage area of the plurality of storage areas in an order of receipt while awaiting occurrence of the at least one of the plurality predefined conditions, each storage area of the plurality of storage areas corresponding to a different predefined condition of the plurality of predefined conditions, wherein the at least one received conditional order is not based solely on a price of the financial instrument;
   an electronic event feed comparator operative to receive, from a data source external to the electronic trading system, data corresponding to an occurrence of any of the plurality of predefined conditions, wherein the event feed comparator is further operative to compare the data received from the data source external to the electronic trading system with a plurality of predetermined data values indicating the occurrence of at least one of the plurality of predefined conditions and based thereon determine when the data received from the data source external to the electronic trading system indicates that at least one of the plurality of predefined conditions has occurred, wherein the occurrence of the at least one of the plurality of predefined condition causes a triggering of a retrieval of each of the plurality of processed conditional orders stored in the same storage area of the plurality of storage areas by a matching event engine and an execution of each of the plurality of processed conditional orders by a matching order engine;
   an electronic matching engine coupled with the storage device and the electronic event feed comparator and including:
   the matching event engine operative to, based on the determination that at least one of the plurality of predefined conditions has occurred, retrieve from the storage device, each of the plurality of processed conditional orders stored therein in the same storage area of the plurality of storage areas associated with each of the at least one of the plurality of predefined conditions which was determined to have occurred; and
   the matching order engine coupled with the matching event engine and operative to execute each of the retrieved processed conditional orders in the order in which those retrieved processed conditional orders were stored in the same storage area of the plurality of storage areas associated with each of the at least one of the plurality of predefined conditions which was determined to have occurred,
   wherein each of the retrieved processed conditional orders are executed by the matching order engine prior to any other orders transmitted over the communication network to the electronic trading system subsequent to having been generated external thereto based on any of the at least one of the plurality of predefined conditions which was determined to have occurred, wherein the execution of the plurality of retrieved processed conditional orders prior to the any other orders is based on a reduced network latency of the plurality of retrieved processed conditional orders not having to travel over the communications network and not having to be processed following the occurrence of the at least one of the plurality of predefined conditions compared with the network latency of the any other orders that have to travel over the communication network and having to be processed following the occurrence of the at least one of the plurality of predefined conditions,
   wherein the occurrence of the at least one of the plurality of predefined condition causes a triggering of the generation and transmission over the communication network of the any other orders to the electronic trading system, and
   wherein the electronic order receiving device processes the any other orders subsequent to the occurrence of the at least one of the plurality of predefined conditions.

2. The computer-implemented electronic trading system of claim 1, wherein the matching event engine is further configured to remove the specified at least one of a plurality of predefined conditions of each of the plurality of retrieved processed conditional orders prior to execution of the matching order engine.

3. The computer-implemented electronic trading system of claim 1, wherein the conditional order specifies a plurality of the plurality of predefined conditions, the matching event engine further configured to remove from the conditional order those of the specified predefined conditions which have been determined to have occurred.

4. The computer-implemented electronic trading system of claim 1, wherein the storage device is accessible via the communication network by the electronic order entry device, wherein the electronic order entry device is used to generate conditional orders to obtain the plurality of predefined conditions for selection by the user.

5. The computer-implemented electronic trading system of claim 1, wherein the data received by the electronic event feed comparator is structured in a predetermined format.

6. The system of claim 1, the financial instrument being of a type selected from the group consisting of futures, contracts, options, bonds, securities, commodities, annuities, currencies, and combinations thereof.

7. A computer-implemented method comprising:
receiving, by a processor coupled with an electronic trading system, from a first user via a first graphical user interface of an electronic order entry device implemented by a second processor, in advance of an occurrence of at least one of a plurality of predefined conditions which occur external to the electronic trading system, at least one conditional order of a plurality of conditional orders for a financial instrument over a communication network coupled with the processor disposed between the electronic order entry device and a matching order engine, where the at least one received conditional order specifies at least one of the plurality of predefined conditions which occur external to the electronic trading system subsequent to receipt of the conditional order, wherein the at least one received conditional order is not based solely on a price of the financial instrument;
processing, by the processor, the at least one received conditional order;
determining, by the processor, that the at least one of the plurality of predefined conditions cannot occur until a future time;
storing, by the processor, the at least one processed conditional order in an order storage device of the electronic trading system, the order storage device being divided into a plurality of storage areas, wherein a plurality of processed conditional orders specifying the same at least one predefined condition are stored together in a same storage area of the plurality of storage areas in an order of receipt while awaiting occurrence of the at least one of the plurality of predefined conditions, each storage area of the plurality of storage areas corresponding to a different predefined condition of the plurality of predefined conditions;
receiving, by the processor, data via an electronic event feed, the data corresponding to the occurrence of any of the plurality of predefined conditions;
comparing, by the processor, the data received from a data source external to the electronic trading system with a plurality of predetermined data values indicating the occurrence of at least one of the plurality of predefined conditions;
determining, by the processor based on the comparing, when the data received from the data source external to the electronic trading system indicates that at least one of the plurality of predefined conditions has occurred, wherein the occurrence of the at least one of the plurality of predefined condition causes a triggering of a retrieval of each of the plurality of processed conditional orders stored in the same storage area of the plurality of storage areas by the processor and an execution of each of the plurality of processed conditional orders by a matching order engine;
retrieving, by the processor based on the determining, from the storage device, each of the plurality of processed conditional orders stored therein in the same storage area of the plurality of storage areas associated with each of the at least one of the plurality of predefined conditions which was determined to have occurred;
determining, by the processor, if any of the plurality of retrieved processed conditional orders is expired;
executing, by a matching order engine, each of the plurality of retrieved processed conditional orders that has not expired in the order in which those plurality of processed conditional orders were stored in the same storage area of the plurality of storage areas associated with each of the at least one of the plurality of predefined conditions which was determined to have occurred; and
submitting, by the processor, each of the plurality of retrieved processed conditional orders that has expired for cancellation,
wherein each of the plurality of retrieved processed conditional orders that has not expired are executed, by the matching order engine, prior to any other orders transmitted over the communication network to the electronic trading system subsequent to having been generated external thereto based on any of the at least one of the plurality of predefined conditions which was determined to have occurred, wherein the executing of the plurality of retrieved processed conditional orders prior to the any other orders is based on a reduced network latency of the plurality of retrieved processed conditional orders not having to travel over the communications network and not having to be processed following the occurrence of the at least one of the plurality of predefined conditions compared with the network latency of the any other orders that have to travel over the communication network and having to be processed following the occurrence of the at least one of the plurality of predefined conditions,
wherein the occurrence of the at least one of the plurality of predefined conditions causes a triggering of the generation and transmission over the communication network of the any other orders to the processor, and
wherein the processor processes the any other orders subsequent to the occurrence of the at least one of the plurality of predefined conditions.

8. The method of claim 7, wherein the receiving, by the processor, of the at least one conditional order is at an order receiving device of the electronic trading system, the method comprising:
generating, by the processor, a message to report the execution of each of the plurality of retrieved processed conditional orders that has not expired.

9. The method of claim 7, wherein the at least one conditional order specifies a plurality of the plurality of predefined conditions, the method further comprising:
if the data received via the electronic event feed matches one of the specified plurality of the plurality of predefined conditions of the conditional order, then removing, by the processor, the matching one of the plurality of predefined conditions from the at least one conditional order and storing the at least one conditional order in the order storage device.

10. The method of claim 7, where storing, by the processor, the at least one received conditional order in the order storage device includes identifying, by the processor, an appropriate queue in a storage area of the order storage device for temporarily storing the at least one received conditional order.

11. The method of claim 10, where a first conditional order with a first specified predefined condition is assigned, by the processor, a higher priority in the queue in the storage area than a second conditional order with the same specified first predefined condition, when the first conditional order is received at the electronic trading system before the second conditional order.

* * * * *